United States Patent
Sun et al.

(10) Patent No.: US 11,758,535 B2
(45) Date of Patent: Sep. 12, 2023

(54) MULTI-USER DOWNLINK FEEDBACK INFORMATION FOR CONFIGURED GRANT UPLINK

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 17/303,756

(22) Filed: Jun. 7, 2021

(65) Prior Publication Data
US 2022/0046667 A1    Feb. 10, 2022

Related U.S. Application Data

(60) Provisional application No. 62/706,321, filed on Aug. 10, 2020.

(51) Int. Cl.
*H04W 72/1268* (2023.01)
*H04L 1/1812* (2023.01)
*H04W 72/23* (2023.01)

(52) U.S. Cl.
CPC ....... *H04W 72/1268* (2013.01); *H04L 1/1812* (2013.01); *H04W 72/23* (2023.01)

(58) Field of Classification Search
CPC .. H04W 72/1268; H04W 72/14; H04L 1/1812
See application file for complete search history.

(56) References Cited

U.S. PATENT DOCUMENTS

2021/0105812 A1* 4/2021 Rastegardoost .......... H04L 1/08

* cited by examiner

*Primary Examiner* — Anh Ngoc M Nguyen
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, at least one configured grant physical uplink shared channel (CG-PUSCH) in a CG-PUSCH occasion associated with the UE. The base station may transmit, and the UE may receive, multi-user downlink feedback information (DFI) addressed to multiple UEs. In some aspects, the multi-user DFI may include hybrid automatic repeat request acknowledgement (HARQ-ACK) feedback associated with the at least one CG-PUSCH. Numerous other aspects are provided.

30 Claims, 8 Drawing Sheets

MULTI-USER DOWNLINK FEEDBACK INFORMATION FOR CONFIGURED GRANT UPLINK

CROSS-REFERENCE TO RELATED APPLICATION

This patent application claims priority to U.S. Provisional Patent Application No. 62/706,321, filed on Aug. 10, 2020, and entitled "MULTI-USER DOWNLINK FEEDBACK INFORMATION FOR CONFIGURED GRANT UPLINK." The disclosure of the prior application is considered part of and is incorporated by reference into this patent application.

FIELD OF THE DISCLOSURE

Aspects of the present disclosure generally relate to wireless communication and to techniques and apparatuses for multi-user downlink feedback information (DFI) for configured grant uplink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting at least one configured grant physical uplink shared channel (CG-PUSCH) in a CG-PUSCH occasion associated with the UE; and receiving multi-user downlink feedback information (DFI) addressed to multiple UEs, wherein the multi-user DFI includes hybrid automatic repeat request acknowledgement (HARQ-ACK) feedback associated with the at least one CG-PUSCH.

In some aspects, a method of wireless communication performed by a base station includes: receiving a CG-PUSCH transmitted in a CG-PUSCH occasion associated with a UE; and transmitting multi-user DFI addressed to multiple UEs, wherein the multi-user DFI includes HARQ-ACK feedback associated with the CG-PUSCH transmitted in the CG-PUSCH occasion associated with the UE.

In some aspects, a UE for wireless communication includes a memory and one or more processors, coupled to the memory, configured to: transmit at least one CG-PUSCH in a CG-PUSCH occasion associated with the UE; and receive multi-user DFI addressed to multiple UEs, wherein the multi-user DFI includes HARQ-ACK feedback associated with the at least one CG-PUSCH.

In some aspects, a base station for wireless communication includes a memory and one or more processors, coupled to the memory, configured to: receive a CG-PUSCH transmitted in a CG-PUSCH occasion associated with a UE; and transmit multi-user DFI addressed to multiple UEs, wherein the multi-user DFI includes HARQ-ACK feedback associated with the CG-PUSCH transmitted in the CG-PUSCH occasion associated with the UE.

In some aspects, a non-transitory computer-readable medium storing a set of instructions for wireless communication includes one or more instructions that, when executed by one or more processors of a UE, cause the UE to: transmit at least one CG-PUSCH in a CG-PUSCH occasion associated with the UE; and receive multi-user DFI addressed to multiple UEs, wherein the multi-user DFI includes HARQ-ACK feedback associated with the at least one CG-PUSCH.

In some aspects, a non-transitory computer-readable medium storing a set of instructions for wireless communication includes one or more instructions that, when executed by one or more processors of a base station, cause the base station to: receive a CG-PUSCH transmitted in a CG-PUSCH occasion associated with a UE; and transmit multi-user DFI addressed to multiple UEs, wherein the multi-user DFI includes HARQ-ACK feedback associated with the CG-PUSCH transmitted in the CG-PUSCH occasion associated with the UE.

In some aspects, an apparatus for wireless communication includes: means for transmitting at least one CG-PUSCH in a CG-PUSCH occasion; and means for receiving multi-user DFI addressed to multiple UEs, wherein the multi-user DFI includes HARQ-ACK feedback associated with the at least one CG-PUSCH.

In some aspects, an apparatus for wireless communication includes: means for receiving a CG-PUSCH transmitted in a CG-PUSCH occasion associated with a UE; and means for transmitting multi-user DFI addressed to multiple UEs, wherein the multi-user DFI includes HARQ-ACK feedback associated with the CG-PUSCH transmitted in the CG-PUSCH occasion associated with the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
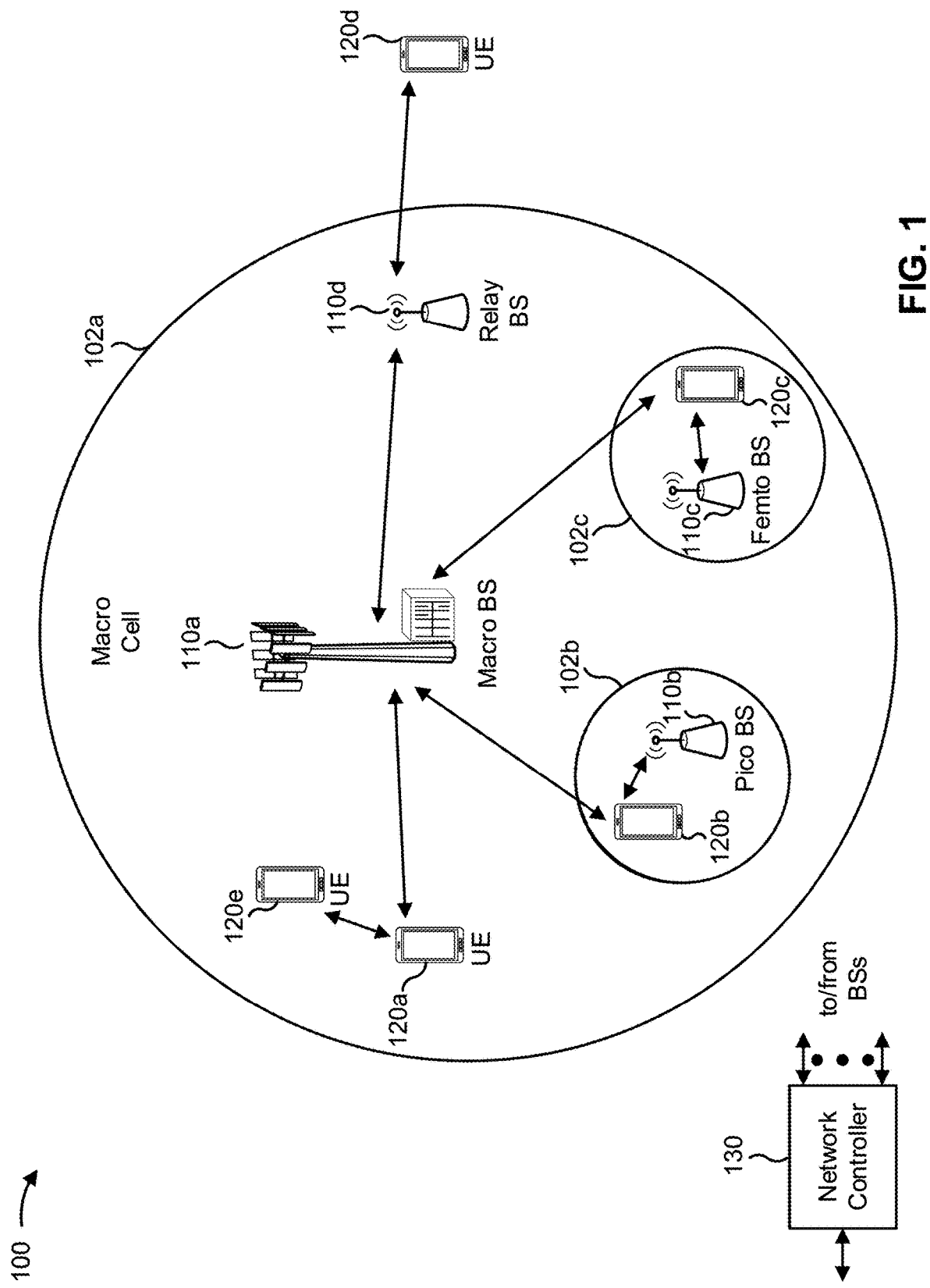
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
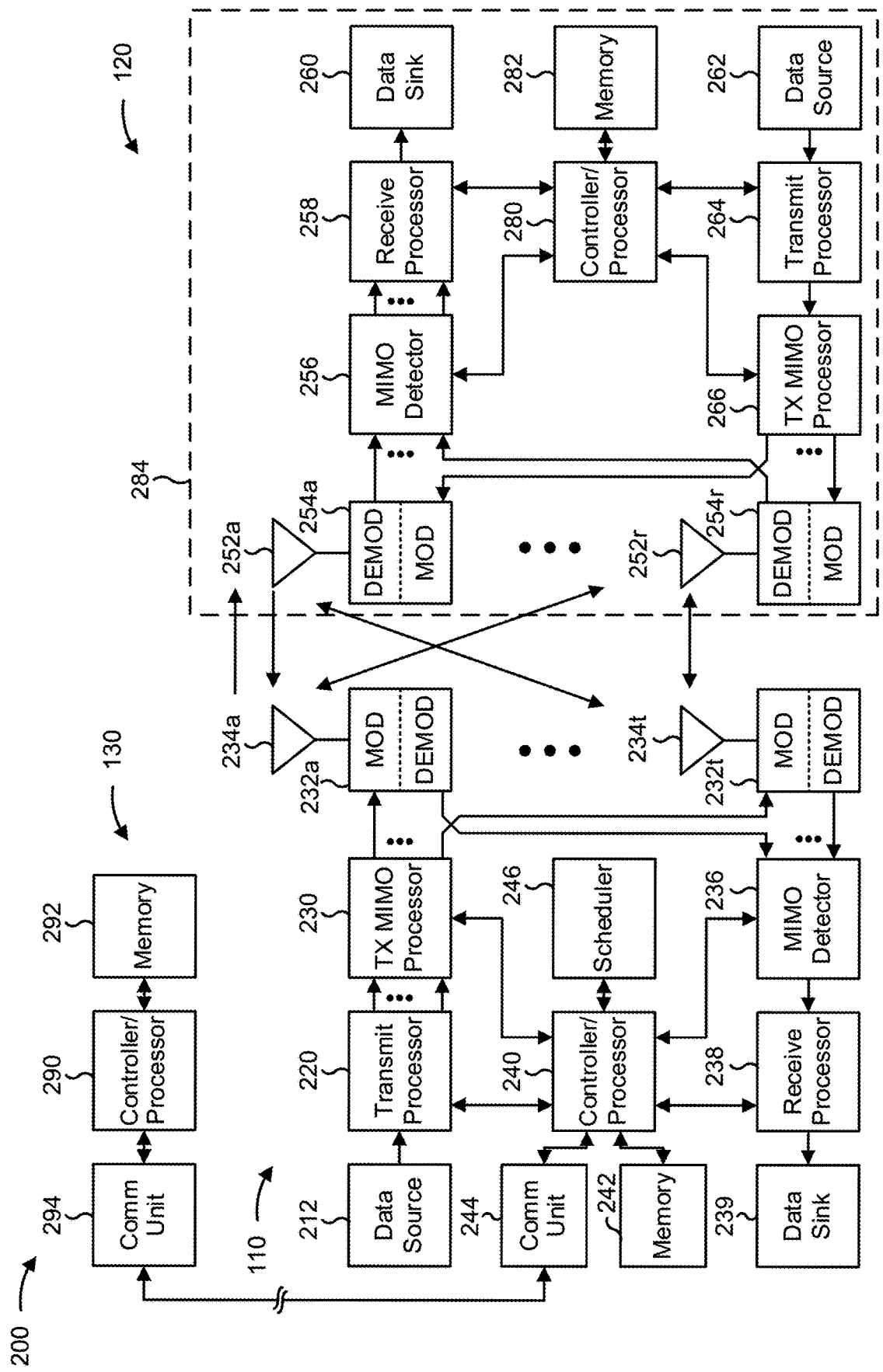
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4A-4C, FIG. 5, and/or FIG. 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4A-4C, FIG. 5, and/or FIG. 6).

Controller/processor 240 of base station 110, controller/processor 280 of UE 120, and/or any other component(s) of FIG. 2 may perform one or more techniques associated with multi-user downlink feedback information (DFI) for configured grant (CG) uplink, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for transmitting at least one CG-PUSCH in a CG-PUSCH occasion associated with UE 120 (e.g., using controller/processor 280, transmit processor 264, TX MIMO processor 266, MOD 254, antenna 252, memory 282, and/or the like), means for receiving multi-user DFI addressed to multiple UEs 120 (e.g., using antenna 252, DEMOD 254, MIMO detector 256, receive processor 258, controller/processor 280, memory 282, and/or the like), wherein the multi-user DFI includes HARQ-ACK feedback associated with the at least one CG-PUSCH, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving a CG-PUSCH transmitted in a CG-PUSCH occasion associated with UE 120 (e.g., using antenna 234, DEMOD 232, MIMO detector 236, receive processor 238, controller/processor 240, memory 242, and/or the like), means for transmitting multi-user DFI addressed to multiple UEs 120 (e.g., using controller/processor 240, transmit processor 220, TX MIMO processor 230, MOD 232, antenna 234, memory 242, and/or the like), wherein the multi-user DFI includes HARQ-ACK feedback associated with the CG-PUSCH transmitted in the CG-PUSCH occasion associated with UE 120, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
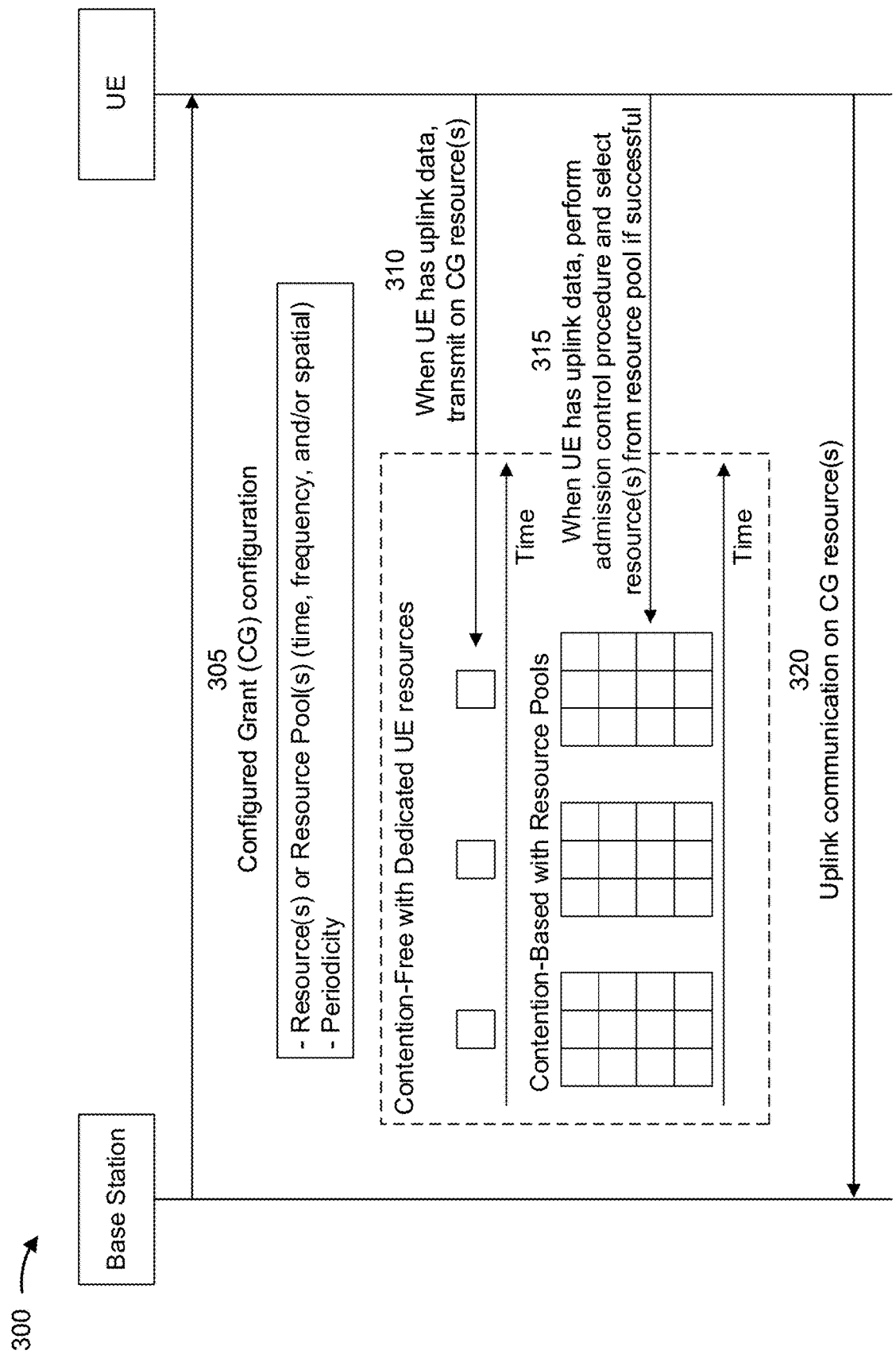
FIG. 3 is a diagram illustrating an example of configured grant (CG) communication, in accordance with the present disclosure.

FIG. 3 is a diagram illustrating an example of configured grant (CG) communication, in accordance with the present disclosure. As shown in FIG. 3, example 300 includes a base station (e.g., base station 110) and a UE (e.g., UE 120) in communication in a wireless network (e.g., wireless network 100).

As shown in FIG. 3, and by reference number 305, the base station may transmit a CG configuration to the UE. For example, the base station may transmit configuration information that identifies the CG (e.g., in a radio resource configuration (RRC) message, in a downlink control information (DCI) message, and/or the like). In some aspects, the configuration information that identifies the CG may indicate a resource allocation (e.g., in a time domain, frequency domain, spatial domain, code domain, and/or the like), a periodicity associated with the resource allocation, and/or the like. The CG may identify a resource or set of resources available to the UE for transmission of an uplink communication (e.g., data, control information, and/or the like). For example, the CG configuration may identify a resource allocation for a physical uplink shared channel (PUSCH), which may be referred to as a CG-PUSCH. In some aspects, the CG configuration may identify a resource pool or multiple resource pools that may be available to the UE for an uplink transmission that does not require the UE to transmit a scheduling request and receive a dynamic uplink grant.

In some aspects, the CG configuration may configure contention-free CG communication with resources dedicated for the UE to transmit uplink communications. In this case, the CG configuration may indicate a resource allocation (e.g., in a time domain, frequency domain, spatial domain, code domain, and/or the like) dedicated for the UE to use to transmit uplink communications. In some aspects, the CG configuration may configure the resource allocation for the UE to occur periodically, such that the resource allocation corresponds to periodically occurring transmission time occasions, which may be referred to herein as CG-PUSCH occasions. As shown in FIG. 3, and by reference number 310, when the UE has uplink data to transmit, the UE may transmit the uplink data in a CG-PUSCH using the CG resources identified by the CG configuration. For example, the UE may transmit the uplink data in one or more of the CG-PUSCH occasions identified in the CG configuration using the resource allocation indicated in the CG configuration information.

A CG configuration with regular periodic CG-PUSCH occasions with a dedicated resource allocation for the UE may be convenient for a UE with periodic uplink traffic (e.g., with trivial jitter). Additionally, or alternatively, a CG configuration may reduce uplink latency because the UE does not have to request and receive a dynamic uplink grant, which may enable ultra-reliable low-latency communication (URLLC) and/or other delay-sensitive services. The CG configuration may configure the periodicity associated with the resource allocation to associate CG-PUSCH occasions with periodic nominal arrival times at which traffic to be transmitted to the base station is expected to arrive at (or be ready to be transmitted by) the UE. However, the actual arrival times at which the traffic arrives (or is ready to be transmitted) by the UE may be different than the nominal arrival times, and this difference in times is known as jitter. In some aspects, traffic jittering may be handled by configuring multiple CGs around the nominal arrival times. In some aspects, multiple opportunities for the UE to transmit the uplink communication may be defined within a CG-PUSCH occasion. The UE may be configured with multiple CG uplinks to allow the UE to repeatedly transmit the CG-PUSCH communications and increase the likelihood that the base station receives the CG-PUSCH communications. NR CG uplink may depend on dynamic grant retransmission. In some aspects, to suppress a quantity of dynamic grants, the CG can be configured with blind retransmissions via multiple repetitions per CG-PUSCH occasion.

In some cases, CG configurations with dedicated resources allocated per UE may be inefficient. For example, CG configurations with dedicated UE resources for a large number of UEs may consume an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG-PUSCH occasion, only one opportunity may be effectively utilized. In yet another example, when a blind repetition scheme is used for retransmissions, a packet may have already been decoded after the first one or more repetitions (early decoding) such that a remainder of the repetitions are unnecessary. Unlike a downlink case, this type of inefficient consumption of system resources cannot be addressed by scheduling, as the base station does not know exactly when traffic will arrive at the UEs.

In some aspects, statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the base station, cases in which a traffic arrival density for traffic arriving at the UEs is time varying, and/or the like. For example, statistical multiplexing of CG uplink communications from multiple UEs may be useful for a network deployment that may have a large quantity of UEs (e.g., an industrial wireless sensor network, an industrial IoT (IIoT) network, and/or the like). In such cases, the uplink traffic associated with at least a group of UEs may be delay insensitive.

As shown in FIG. 3, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (e.g., in a time domain, frequency domain, spatial domain, code domain, and/or the like) that can be allocated for uplink transmission for one or more UEs. For example, an x-axis of an illustrated resource pool may indicate transmission times and a y-axis of the illustrated resource pool may indicate resources (e.g., frequency domain, spatial domain, code domain, and/or the like) that can be allocated at each transmission time. In some aspects, the same resource pools may be configured for multiple UEs.

Statistical multiplexing schemes may involve spreading control and overloading control. For example, spreading relates to distributing traffic (as interference to others) into a resource pool. In a specific example, direct spreading CDMA may be utilized in legacy 3G systems. NR systems which rely on an OFDMA network may utilize organized randomized resource selection, in which the base station can identify sources that contribute to collisions in a resource pool and/or local overloading of a resource pool.

Overloading control relates to controlling a level of multiplexing within a stable region. For example, overly aggressive multiplexing may result in an unusable resource pool. Rise over thermal (RoT) based control (in addition to power control) may be utilized in legacy 3G systems. In 3GPP, a central scheduler may be used to assign grants to respective UEs. In 3GPP2, a hybrid approach may be used in which an access network sends a reverse link activity bit to guide autonomous rate selection at respective UEs. Channel busy ratio (CBR) based control may be utilized in NR sidelink. For example, each sidelink UE may autonomously measure CBR and regulate its channel use based at least in part on the measured CBR.

As further shown in FIG. 3, and by reference number 315, for the contention-based CG configuration, when the UE has uplink data to be transmitted, the UE may perform an admission control procedure and select one or more resources from the resource pool if the admission control procedure is successful. In some aspects, the admission control procedure may include the UE selecting a random number (e.g., between 0 and 1 or another suitable range), comparing the random number and a threshold, and determining whether the random number satisfies the threshold. If the random number satisfies the threshold, then the admission is successful and the UE selects a resource from the resource pool to transmit the uplink communication.

In some aspects, the base station may control the probability of the UE accessing the resource pool by setting and/or adjusting the threshold. For example, the base station may dynamically adjust the threshold to permit more or fewer UEs to access the resource pool in order to prevent resource collisions. Additionally, or alternatively, the base station may assign different thresholds to be used by different UEs.

Based at least in part on the UE determining that the random number satisfies the threshold, the UE may select a resource from the resource pool to transmit the uplink communication. The UE may select the resource from the resource pool using randomized and/or pseudo-randomized resource selection. For example, the UE may use a hashing function based at least in part on a UE identifier, time, and/or resource pool index to select the resource from the resource pool.

As further shown in FIG. 3, and by reference number 320, the UE transmits the uplink communication to the base station on the CG resource. For example, the UE may transmit the uplink communication as a CG-PUSCH communication using a resource allocation (e.g., a CG-PUSCH occasion) identified by the CG.

As described above, to increase reliability for CG-PUSCH communications, a UE may be configured with multiple opportunities to transmit the uplink communication within a CG-PUSCH occasion, may be configured with multiple CG uplinks to allow the UE to repeatedly transmit the CG-PUSCH communications, may be configured to perform retransmissions based at least in part on a dynamic grant or perform blind retransmissions via multiple repetitions per CG-PUSCH occasion without waiting for feedback, and/or the like. Furthermore, in some wireless networks, hybrid automatic repeat request (HARQ) acknowledgement (HARQ-ACK) feedback may be used to indicate whether a transmission is successfully received and/or decoded. For example, a UE may transmit a HARQ acknowledgement (ACK) to a base station to indicate that a scheduled transmission from the base station is successfully received and decoded. In contrast, the UE may transmit a HARQ negative acknowledgement (NACK) to indicate that the scheduled transmission is not successfully received and/or unsuccessfully decoded. However, in the case of a CG-PUSCH, HARQ-ACK feedback is generally supported only in unlicensed spectrum (e.g., NR unlicensed (NR-U), LTE further enhanced licensed assisted access (LTE-feLAA), and/or the like).

For example, in unlicensed spectrum, a base station may transmit downlink feedback information (DFI) to a UE to carry HARQ-ACK feedback for one or more CG-PUSCH transmissions. The DFI may carry an ACK or a NACK for all HARQ processes allocated to a UE, which may include one or more HARQ processes that are allocated to CG-PUSCH occasions, one or more HARQ processes that are allocated to dynamic grant PUSCH (DG-PUSCH) transmissions, and/or the like. For example, for a DG-PUSCH, the HARQ-ACK feedback may be provided in the DFI to enable contention window adjustment. In this way, a UE that transmits a transport block in a CG-PUSCH may use the HARQ-ACK feedback in the DFI to determine whether to retransmit the transport block in another CG-PUSCH resource (e.g., in cases where the HARQ-ACK feedback includes a NACK for the CG-PUSCH carrying the transport block). In contrast, in licensed spectrum, CG-PUSCH transmissions only carry initial transmissions (e.g., new transport blocks), and retransmissions are generally handled using dynamic grants, blind repetition, and/or the like. However, extending support for DFI to indicate HARQ-ACK feedback to allow retransmission in configured uplink resources in licensed or unlicensed spectrum presents various challenges.

For example, the DFI used in unlicensed spectrum includes a UE-specific bitmap that includes the HARQ-ACK feedback associated with all HARQ processes allocated to a UE. Accordingly, the DFI is typically transmitted in a UE-specific DCI message (e.g., a DCI message having format 0_1) scrambled by a configured scheduling radio network temporary identifier (CS-RNTI) that is configured for the UE. As a result, a UE-specific DCI that includes UE-specific DFI is needed for each UE that transmits a CG-PUSCH, which may result in substantial downlink control overhead in a network that includes many UEs with CG-PUSCH configurations (e.g., an IIoT system in which many wireless sensors or other nodes on a factory floor are associated with CG-PUSCH configurations to enable frequent reporting sensing data reporting). Accordingly, although a CG configuration may reduce uplink control overhead by eliminating a need for a dynamic uplink grant, the need for a UE-specific DCI to provide DFI for each CG-PUSCH transmission introduces additional downlink control overhead that may reduce the benefits of the CG configuration.

One possible approach to reduce the downlink control overhead may be to bundle the DFI of multiple UEs into one DCI message. For example, the DFI may require only sixteen (16) bits corresponding to sixteen (16) HARQ process identifiers, and the DCI message that carries the DFI may include a larger number of bits (e.g., forty or sixty bits). Accordingly, rather than padding the unused bits in the DCI with zeros in order to match the DCI bit length, the DCI may be configured to include HARQ-ACK bitmaps for multiple component carriers that are configured for one UE, separate HARQ-ACK bitmaps for multiple UEs, and/or the like to reduce control overhead. However, efforts to implement these approaches have been unsuccessful due to configuration complexity (e.g., uncertainty with respect to whether two or more UEs will always transmit one or more CG-PUSCH communications at the same time).

Some aspects described herein relate to techniques and apparatuses to enable multi-user DFI for a CG uplink. For example, in some aspects, one or more UEs may transmit CG-PUSCH communications to a base station in one or more CG-PUSCH occasions that are configured for the UE(s), and the base station may transmit multi-user DFI addressed to multiple UEs. In some aspects, the multi-user DFI may be transmitted in a group common DCI message that is addressed to the multiple UEs, and may include HARQ-ACK feedback associated with the CG-PUSCH communications transmitted in the one or more CG-PUSCH occasions. For example, the base station may configure a mapping between CG-PUSCH occasions that are configured for the multiple UEs and corresponding bit positions in the multi-user DFI. Furthermore, in some aspects, the base station may configure one or more parameters to enable the UEs to monitor for and decode the group common DCI message that includes the multi-user DFI, and the base station may further configure the multi-user DFI to indicate and/or resolve one or more collisions among HARQ-ACK feedback for different UEs in cases where CG-PUSCH occasions associated with multiple UEs are mapped to the same bit position(s) in the multi-user DFI. In this way, the base station may transmit one group common DCI message to indicate HARQ-ACK feedback information to multiple UEs that are associated with a CG configuration in licensed or unlicensed spectrum, which significantly reduces downlink control overhead relative to transmitting DFI to different UEs using UE-specific DCI messages. Furthermore, enabling multi-user DFI may enable retransmissions using configured uplink resources, which may further reduce the control overhead associated with retransmissions (e.g., by avoiding a need for blind repetitions, dynamic grants to schedule retransmissions, and/or the like).

As indicated above, FIG. 3 is provided as an example. Other examples may differ from what is described with regard to FIG. 3.

Figure 4A:
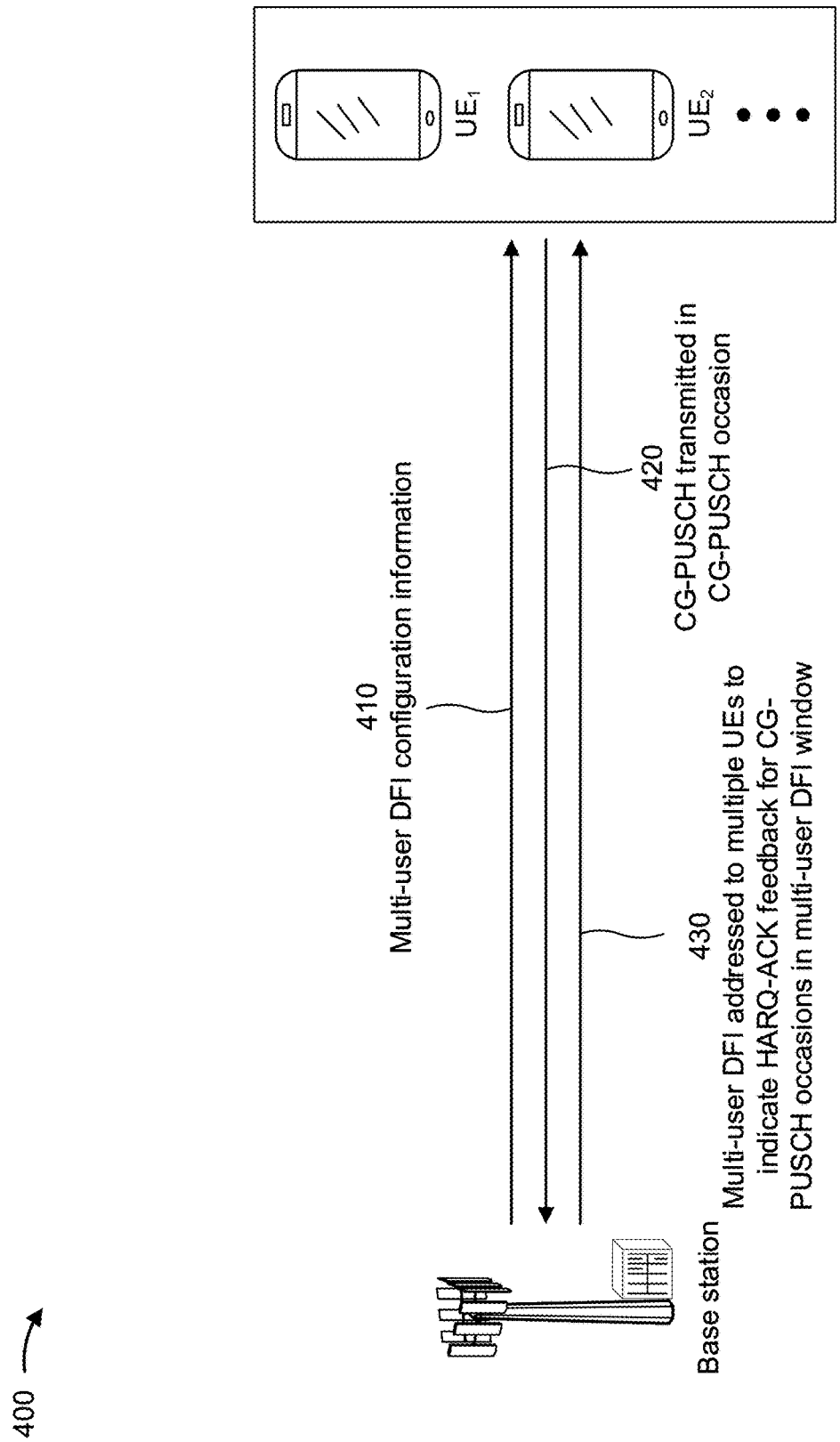
FIGS. 4A-4C are diagrams illustrating examples associated with multi-user downlink feedback information (DFI) for CG uplink, in accordance with the present disclosure.
Figure 4B:
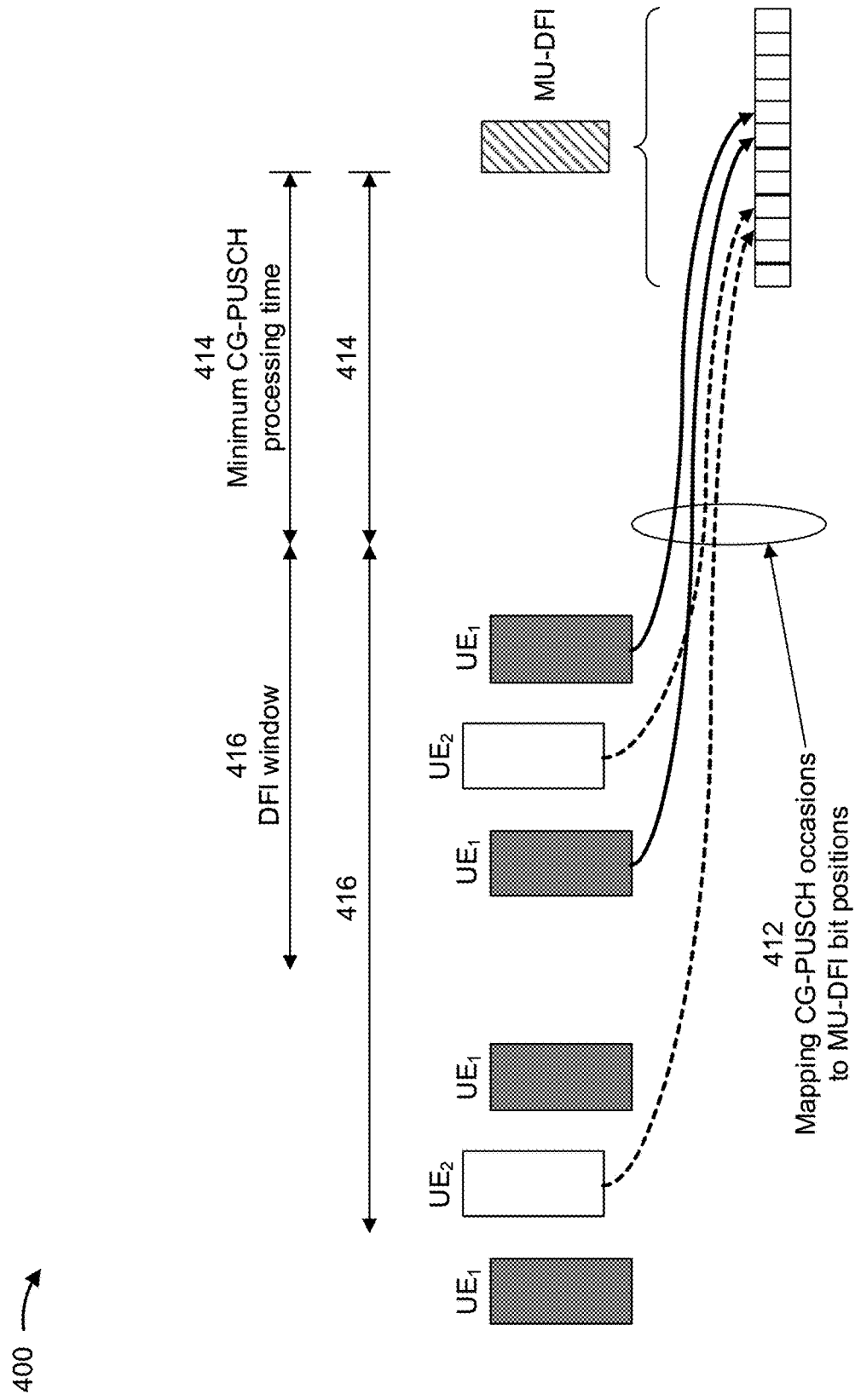
Figure 4C:
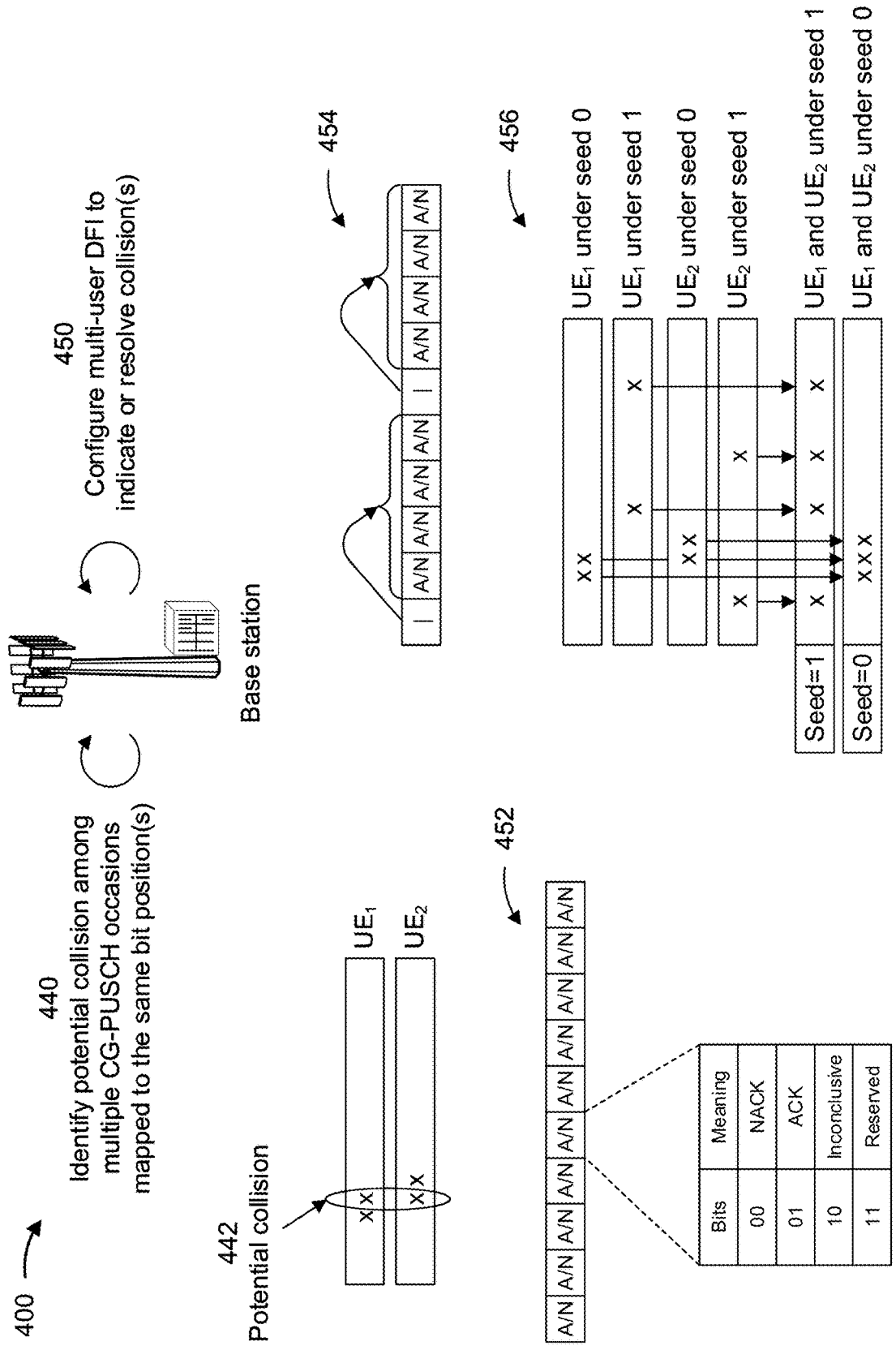

FIGS. 4A-4C are diagrams illustrating examples 400 associated with multi-user DFI for CG uplink, in accordance with the present disclosure. As shown in FIGS. 4A-4C, examples 400 include a base station (e.g., base station 110) in communication with multiple UEs (e.g., $UE_1$, $UE_2$, and/or the like, each of which may be associated with a configuration similar to UE 120 and/or the like). Furthermore, as described herein, the multiple UEs may communicate with the base station in a wireless network (e.g., wireless network 100) using licensed or unlicensed spectrum, and the multiple UEs may each be associated with a CG configuration that enables the UE(s) to transmit a CG-PUSCH in a CG-PUSCH occasion without requesting an uplink grant.

As shown in FIG. 4A, and by reference number 410, the base station may transmit multi-user DFI configuration information to the UEs. In some aspects, as described herein, the multi-user DFI configuration information may be provided to configure a DCI message (e.g., a group common DCI message) that includes HARQ-ACK feedback for CG-PUSCH communications transmitted by multiple UEs.

Accordingly, in some aspects, the multi-user DFI configuration information may indicate one or more parameters to configure a single (e.g., group common) DCI message that includes multi-user DFI addressed to multiple UEs that recently transmitted one or more CG-PUSCH communications (e.g., rather than sending multiple UE-specific DCI messages that each include UE-specific DFI for a particular UE that transmitted a CG-PUSCH). In particular, the multi-user DFI configuration information may generally enable each UE to monitor and decode the DCI message that includes the multi-user DFI such that each UE can identify the HARQ-ACK feedback for one or more CG-PUSCH communications transmitted by the UE.

In some aspects, the multi-user DFI configuration information may include a separate RNTI associated with the DCI message to be used to carry the multi-user DFI. For example, because the multi-user DFI is shared among multiple UEs, the RNTI may include a DFI-RNTI to distinguish the DCI message used to carry the multi-user DFI from other DCI messages that the UEs may be receiving. Furthermore, the DFI-RNTI used to scramble the DCI message to be used to carry the multi-user DFI may be supported in addition to UE-specific DFI included in a UE-specific DCI message that is scrambled with a UE-specific CS-RNTI. In such cases, the multi-user DFI may have a lower priority than the UE-specific DFI because the multi-user DFI may be associated with potential collision events (e.g., where CG-PUSCH occasions associated with different UEs are mapped to the same bit(s) in the multi-user DFI, as described in more detail below). Accordingly, because UE-specific DFI is not subject to a risk of an error event due to a collision or conflict between the HARQ-ACK feedback for different UEs, a UE-specific DCI that is scrambled with a CS-RNTI to indicate UE-specific DFI may have a higher priority than the DCI that is scrambled with the DFI-RNTI to indicate HARQ-ACK feedback for multiple UEs.

Furthermore, in some aspects, the multi-user DFI configuration information may include a length associated with the DCI to be used to carry the multi-user DFI. For example, each UE may need to know the DCI length in order to decode the DCI. Accordingly, because the DCI used to carry the multi-user DFI is shared among multiple UEs, and each UE has a limited number of DCI lengths to monitor, the DCI scrambled with the DFI-RNTI may have the same length as one or more other DCI formats the UE is configured to monitor (e.g., DCI format 0_0, DCI format 0_1, DCI format 1_0, and/or the like). For example, in some aspects, the base station may transmit RRC signaling to the UEs to configure the length of the DCI used to carry the multi-user DFI (e.g., using zero padding to match the length of other DCI formats), or the base station may automatically align the length of the DCI with another DCI format.

Furthermore, in some aspects, the multi-user DFI configuration information may include information mapping CG-PUSCH occasions associated with different UEs to respective bit positions in the multi-user DFI. For example, as shown in FIG. 4B, and by reference number 412, the multi-user DFI may include one or more entries that include HARQ-ACK feedback associated with one or more CG-PUSCH occasions. In some aspects, the multi-user DFI may include a bitmap such that each entry includes one or more bits to indicate an ACK or a NACK for one or more CG-PUSCH occasions that are mapped to the entry. For example, an entry in the bitmap may be set to zero (0) to indicate that the base station did not receive and/or failed to successfully decode a corresponding CG-PUSCH or to one (1) to indicate that the base station received and successfully decoded the corresponding CG-PUSCH.

In some aspects, the base station may configure the mapping between the CG-PUSCH occasions and the corresponding bit positions in the multi-user DFI via RRC signaling or other suitable signaling. For example, each UE, or each CG-PUSCH configuration associated with a UE, may occupy one or more bits in the multi-user DFI at a fixed location that is indicated to the respective UE. In some aspects, the number of bits (or entries) in the multi-user DFI that are associated with a particular UE may correspond to a number of CG-PUSCH transmissions that occur within a window. Accordingly, a UE may expect the multi-user DFI to include HARQ-ACK feedback for the number of CG-PUSCH transmissions that occur within the window.

For example, as shown in FIG. 4B, and by reference number 414, the DFI window may end a minimum CG-PUSCH processing time prior to transmission of the multi-user DFI for all UEs that are to receive HARQ-ACK feedback in the multi-user DFI. In this way, the base station may attempt to decode each CG-PUSCH transmission that is received from a UE, and reserving the minimum processing time may ensure that the base station has sufficient time to identify the HARQ-ACK feedback based at least in part on the decoding results. Furthermore, as shown by reference number 416, the DFI window may be defined as a number of CG-PUSCH occasions, counting backwards from the minimum processing time prior to the multi-user DFI transmission. Additionally, or alternatively, the DFI window may be defined according to a maximum time range or a maximum number of slots, such that the multi-user DFI may exclude HARQ-ACK feedback for any CG-PUSCH occasions that are outside the DFI window. For example, in FIG. 4B, the window configured for $UE_1$ and $UE_2$ may cover N CG-PUSCH occasions that are mapped to respective bits in the multi-user DFI, where N is a positive integer (e.g., two (2) in the illustrated example). Additionally, or alternatively, the maximum time range or maximum number of slots may cover a certain number of CG-PUSCH occasion. In some aspects, the window that defines the number of CG-PUSCH occasions that are covered in the multi-user DFI may be the same for each UEs, or each UE may be configured with a UE-specific window.

As further shown in FIG. 4A, and by reference number 420, one or more of the UEs may transmit one or more CG-PUSCH communications in one or more CG-PUSCH occasions that are configured for the UE(s). For example, as described in further detail above with respect to FIG. 3, a UE having a CG configuration may transmit a CG-PUSCH in a CG-PUSCH occasion using dedicated uplink resources, uplink resource pools shared with other UEs, and/or the like. Accordingly, each UE that transmits a CG-PUSCH within the multi-user DFI window may expect the multi-user DFI to include HARQ-ACK feedback for the CG-PUSCH transmitted within the window. Additionally, or alternatively, HARQ-ACK feedback for one or more CG-PUSCH transmissions that occur outside the window may be provided in UE-specific DFI, or retransmissions for CG-PUSCH transmissions that occur outside the window may be handled using dynamic grants and/or the like. Furthermore, in some aspects, a UE that does not transmit a CG-PUSCH within the window may refrain from monitoring the multi-user DFI (e.g., to conserve power or other resources) even though the UE is configured to monitor the multi-user DFI.

As further shown in FIG. 4A, and by reference number 430, the base station may transmit, and the UE may receive, the multi-user DFI that is addressed to multiple UEs and includes HARQ-ACK feedback for a set of CG-PUSCH occasions within a multi-user DFI window. For example, the base station may attempt to decode each CG-PUSCH transmission received in a CG-PUSCH occasion within the multi-user DFI window, and the base station may configure the multi-user DFI to indicate an ACK if the CG-PUSCH is successfully decoded or a NACK if the base station is unable to decode the CG-PUSCH. Furthermore, in some aspects, the base station may indicate a NACK for each CG-PUSCH occasion in which a CG-PUSCH is not received. For example, the base station may be unable to differentiate a CG-PUSCH that is not transmitted from a CG-PUSCH that is not detected (e.g., due to path loss, corruption, and/or the like), and may therefore indicate a NACK to account for the possibility that a UE transmitted a CG-PUSCH that was not detected by the base station. Accordingly, each UE that transmits a CG-PUSCH within the multi-user DFI window may monitor the DCI that is used to carry the multi-user DFI (e.g., based at least in part on the DFI-RNTI used to scramble the DCI, the configured length of the DCI, and/or the like), and may use the configured mapping of CG-PUSCH occasions to bit positions in the multi-user DFI to identify the ACK/NACK feedback for the corresponding CG-PUSCH transmissions. In this way, the UEs may be enabled to retransmit one or more CG-PUSCH transmissions that are associated with NACK feedback using a single DCI.

However, in some cases, one or more bits (or entries) in the multi-user DFI may be mapped to two or more CG-PUSCH occasions that are configured for two or more UEs, which may result in a potential collision event. For example, in a particular transmission occasion for the multi-user DFI, the base station may determine which UEs are associated with CG-PUSCH occasions for which the multi-user DFI is to include HARQ-ACK feedback. In cases where a particular bit is mapped to multiple CG-PUSCH occasions associated with multiple different UEs, an ACK at the bit location may indicate successful decoding to each of the UEs. Similarly, a NACK at the bit location may indicate that the base station failed to receive and/or decode a corresponding CG-PUSCH. In other words, an ACK can be transmitted in the particular bit that is mapped to multiple CG-PUSCH occasions only if all of the CG-PUSCH transmissions are detected and decoded. This may create a potential collision event in cases where the base station detects and decodes one or more CG-PUSCH transmissions and fails to detect or decode one or more CG-PUSCH transmissions that are mapped to the same bit location. Accordingly, one technique to avoid a potential collision may be for the base station to check all possible multi-user DFI transmission occasions and the CG-PUSCH occasions configured across all UEs that are associated with a particular multi-user DFI when configuring UEs to monitor the multi-user DFI. In this case, the base station may ensure that there are no cases in which a bit in the multi-user DFI is mapped to more than one CG-PUSCH across multiple UEs. However, this approach adds substantial complexity to the multi-user DFI configuration to avoid all possible collisions. Accordingly, in some aspects, the multi-user DFI may be configured to indicate or resolve potential collision events.

For example, as shown in FIG. 4C, and by reference number 440, the base station may identify a potential collision among multiple CG-PUSCH occasions that are mapped to the same bit position(s). For example, reference number 442 illustrates an example of a potential collision where a first UE (shown as $UE_1$) and a second UE (shown as $UE_2$) each have two CG-PUSCH occasions mapped to two respective bits in the multi-user DFI, and one of the bits is mapped to a CG-PUSCH occasions associated with both UEs. In this case, a collision may occur if both UEs transmit a CG-PUSCH in the CG-PUSCH occasion mapped to the shared bit and the base station successfully detects and decodes only one of the CG-PUSCH transmissions. For example, if the base station were to indicate an ACK in the shared bit, the other UE may incorrectly determine that the CG-PUSCH was detected and decoded, which may result in lost data because the other UE may refrain from performing a necessary retransmission. Alternatively, if the base station were to indicate a NACK in the shared bit, the UE that transmitted the successfully decoded CG-PUSCH may unnecessarily waste resources retransmitting the CG-PUSCH.

Accordingly, as further shown in FIG. 4C, and by reference number 450, the base station may configure the multi-user DFI to indicate or resolve collision events. For example, as shown by reference number 452, each entry in the multi-user DFI may be associated with a two-bit state that may have a first value (e.g., '00') to indicate a NACK for all CG-PUSCH occasions mapped to the entry, a second value (e.g., '01') to indicate an ACK for all CG-PUSCH occasions mapped to the entry, or a third value (e.g., '10') to indicate a collision event (e.g., an invalid or inconclusive state). In this way, the base station may indicate an ACK if all possible CG-PUSCH transmissions mapped to the entry are decoded successfully because the HARQ-ACK feedback is the same for all UEs mapped to the entry. Similarly, the base station may indicate a NACK if all possible CG-PUSCH transmissions mapped to the entry are not received and/or fail decoding because the HARQ-ACK feedback is the same for all UEs. Furthermore, in cases where one or more CG-PUSCH transmissions are decoded and one or more CG-PUSCH transmissions are not received or fail decoding, the base station may explicitly indicate the collision event rather than indicating HARQ-ACK feedback that would otherwise be correct for one or more UEs and incorrect for one or more UEs. In this way, the two-bit state may indicate that ACK/NACK cannot be unambiguously identified because a collision occurred, whereby each UE may determine whether to retransmit the CG-PUSCH (e.g., based on a priority of the transport block), rely upon a dynamic retransmission grant, rely upon a higher-priority DCI is scrambled with a UE-specific CS-RNTI to indicate UE-specific DFI, and/or the like. However, associating each entry in the multi-user DFI with a two-bit state essentially doubles the DCI size.

Accordingly, as further shown in FIG. 4C, and by reference number 454, multiple entries in the multi-user DFI may share a one-bit flag that indicates whether the HARQ-ACK feedback for the multiple entries is inconclusive or otherwise associated with a collision event. For example, the one-bit flag shared by the multiple entries may be set to a particular value (e.g., '1') if the HARQ-ACK feedback for one or more of the entries sharing the flag is inconclusive due to a collision. Accordingly, when a UE is configured to monitor one or more bits in the multi-user DFI, the UE may ignore the HARQ-ACK feedback provided in the one or more bits if the one-bit flag indicates a collision event. For example, in FIG. 4C, the multi-user DFI includes a first one-bit flag that is shared by four entries in the multi-user DFI, a second one-bit flag that is shared by another four entries in the multi-user DFI, and/or the like. Accordingly, if the first one-bit flag is set, the UEs that are configured to monitor the four entries that share the first one-bit flag may each ignore the HARQ-ACK feedback provided in the corresponding entries. In this way, a number of additional bits that are needed to indicate a collision event may be reduced relative to the technique of associating each entry with a two-bit state to indicate a NACK, an ACK, or a collision event. However, the technique of using the one-bit flag may indicate a collision event for certain CG-PUSCH occasions that are not in fact subject to a collision event (e.g., if the CG-PUSCH occasion is grouped with other CG-PUSCH occasions that are subject to a collision event). Additionally, or alternatively, all HARQ-ACK feedback in the DCI may be grouped together, in which case the base station may refrain from transmitting the DCI that carries the multi-user DFI if any of the bits are associated with a collision. In this way, there may be no need to insert additional bits into the DCI, and downlink control overhead may be reduced by avoiding transmission of the multi-user DFI. In this case, the base station may instead transmit one or more UE-specific DCI messages to indicate UE-specific DFI for the CG-PUSCH occasions, or may transmit dynamic grants to schedule retransmissions of one or more failed CG-PUSCH transmissions.

Alternatively, as further shown in FIG. 4C, and by reference number 456, the multi-user DFI may be associated with a seed that defines a per-UE random permutation for the bits to be monitored in the multi-user DFI. For example, as described herein, each UE may hash the seed (e.g., based at least in part on a value of the seed and a UE-specific parameter, such as an identifier associated with the UE) to identify one or more bit positions in the multi-user DFI that carry the HARQ-ACK feedback for the CG-PUSCH occasions associated with the UE. In other words, the base station may control the seed included in the multi-user DFI to control the per-UE random permutation that defines the bits that each UE is to monitor in the multi-user DFI. For example, as described herein, the base station may determine the value of the seed depending on whether there are one or more collision events and/or to resolve one or more collision events.

For example, with reference to the potential collision shown by reference number 442, an actual collision does not exist in cases where the base station successfully decodes a CG-PUSCH that $UE_1$ transmits in a second CG-PUSCH occasion and a CG-PUSCH that $UE_2$ transmits in a first CG-PUSCH occasion. Similarly, an actual collision does not exist in cases where the base station fails to detect or decode a CG-PUSCH from $UE_1$ in the second CG-PUSCH occasion and also fails to detect or decode a CG-PUSCH from $UE_2$ in the first CG-PUSCH occasion. Accordingly, as shown by reference number 456, the base station may set the seed to a value (e.g., zero (0)) in which the second CG-PUSCH occasion associated with $UE_1$ and the first CG-PUSCH occasion associated with $UE_2$ are allowed to be mapped to the same bit location (e.g., because the bit location indicates an ACK or a NACK for both UEs). However, in cases where the base station decodes one CG-PUSCH and fails to detect or decode the other CG-PUSCH (e.g., an actual collision occurs), the base station may choose a different seed such that the two CG-PUSCH transmissions are hashed to different bit locations. In this case, when $UE_1$ and $UE_2$ are under seed 1, the UEs may hash the seed to identify the bits in the multi-user DFI that are mapped to the CG-PUSCH occasions associated with each respective UE. In this way, the collision event may be resolved because the seed is chosen such that multiple CG-PUSCH occasions, including one or more CG-PUSCH transmissions that are decoded and one or more that are not decoded, are hashed to different locations.

As indicated above, FIGS. 4A-4C are provided as examples. Other examples may differ from what is described with regard to FIGS. 4A-4C.

Figure 5:
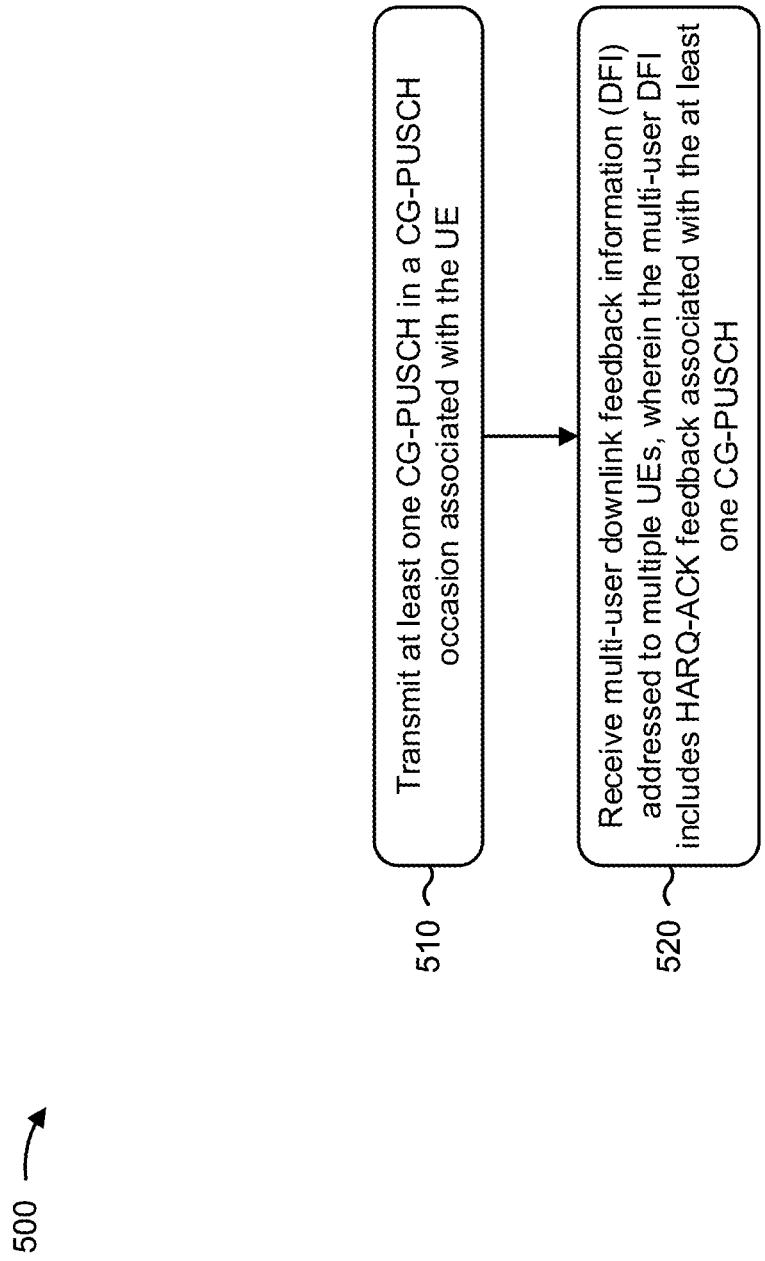
FIGS. 5-6 are diagrams illustrating example processes associated with multi-user DFI for CG uplink, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with multi-user DFI for configured grant uplink.

As shown in FIG. 5, in some aspects, process 500 may include transmitting at least one CG-PUSCH in a CG-PUSCH occasion associated with the UE (block 510). For example, the UE may transmit (e.g., using controller/processor 280, transmit processor 264, TX MIMO processor 266, MOD 254, antenna 252, memory 282, and/or the like) at least one CG-PUSCH in a CG-PUSCH occasion associated with the UE, as described above.

As further shown in FIG. 5, in some aspects, process 500 may include receiving multi-user DFI addressed to multiple UEs, wherein the multi-user DFI includes HARQ-ACK feedback associated with the at least one CG-PUSCH (block 520). For example, the UE may receive (e.g., using antenna 252, DEMOD 254, MIMO detector 256, receive processor 258, controller/processor 280, memory 282, and/or the like) multi-user DFI addressed to multiple UEs, as described above. In some aspects, the multi-user DFI includes HARQ-ACK feedback associated with the at least one CG-PUSCH.

Process 500 may include additional aspects, such as any single aspect or any combination of aspects described below and/or in connection with one or more other processes described elsewhere herein.

In a first aspect, process 500 includes decoding the multi-user DFI based at least in part on one or more parameters associated with the multi-user DFI.

In a second aspect, alone or in combination with the first aspect, the one or more parameters include at least one of a DFI-RNTI or a length associated with a DCI message carrying the multi-user DFI.

In a third aspect, alone or in combination with one or more of the first and second aspects, the multi-user DFI has a lower priority than UE-specific DFI scrambled with a CS-RNTI.

In a fourth aspect, alone or in combination with one or more of the first through third aspects, process 500 includes RRC signaling mapping the CG-PUSCH occasion associated with the UE to one or more bits in the multi-user DFI, and identifying the HARQ-ACK feedback associated with the at least one CG-PUSCH based at least in part on the one or more bits in the multi-user DFI that are mapped to the CG-PUSCH occasion associated with the UE.

In a fifth aspect, alone or in combination with one or more of the first through fourth aspects, a number of the one or more bits in the multi-user DFI that are mapped to the CG-PUSCH occasion associated with the UE corresponds to a number of CG-PUSCH occasions that occur within a window.

In a sixth aspect, alone or in combination with one or more of the first through fifth aspects, the one or more bits in the multi-user DFI that are mapped to the CG-PUSCH occasion associated with the UE include a NACK for one or more of the CG-PUSCH occasions within the window in which the UE did not transmit a CG-PUSCH.

In a seventh aspect, alone or in combination with one or more of the first through sixth aspects, the multi-user DFI includes the HARQ-ACK feedback associated with the at least one CG-PUSCH based at least in part on the UE transmitting the at least one CG-PUSCH within the window.

In an eighth aspect, alone or in combination with one or more of the first through seventh aspects, the window is configured to end a threshold time prior to a transmission time associated with the multi-user DFI.

In a ninth aspect, alone or in combination with one or more of the first through eighth aspects, the window is configured to cover a maximum time range or a maximum number of slots.

In a tenth aspect, alone or in combination with one or more of the first through ninth aspects, an entry in the multi-user DFI has a state to indicate a collision between the HARQ-ACK feedback associated with the at least one CG-PUSCH transmitted by the UE and HARQ-ACK feedback associated with at least one CG-PUSCH transmitted by another UE.

In an eleventh aspect, alone or in combination with one or more of the first through tenth aspects, the entry in the multi-user DFI is mapped to multiple CG-PUSCH occasions and includes a two-bit field to indicate the collision.

In a twelfth aspect, alone or in combination with one or more of the first through eleventh aspects, the entry indicating the collision is a one-bit flag shared among a set of bits in the multi-user DFI, and the set of bits sharing the one-bit flag include one or more bits that indicate the HARQ-ACK feedback associated with the at least one CG-PUSCH transmitted by the UE.

In a thirteenth aspect, alone or in combination with one or more of the first through twelfth aspects, process 500 includes hashing a seed included in the multi-user DFI to identify one or more bits in the multi-user DFI that are mapped to the CG-PUSCH occasion in which the at least one CG-PUSCH is transmitted, and identifying the HARQ-ACK feedback associated with the at least one CG-PUSCH based at least in part on a state of the one or more bits mapped to the CG-PUSCH occasion in which the at least one CG-PUSCH is transmitted.

In a fourteenth aspect, alone or in combination with one or more of the first through thirteenth aspects, the seed has a value to resolve a collision between the HARQ-ACK feedback associated with the at least one CG-PUSCH transmitted by the UE and HARQ-ACK feedback associated with at least one CG-PUSCH transmitted by another UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
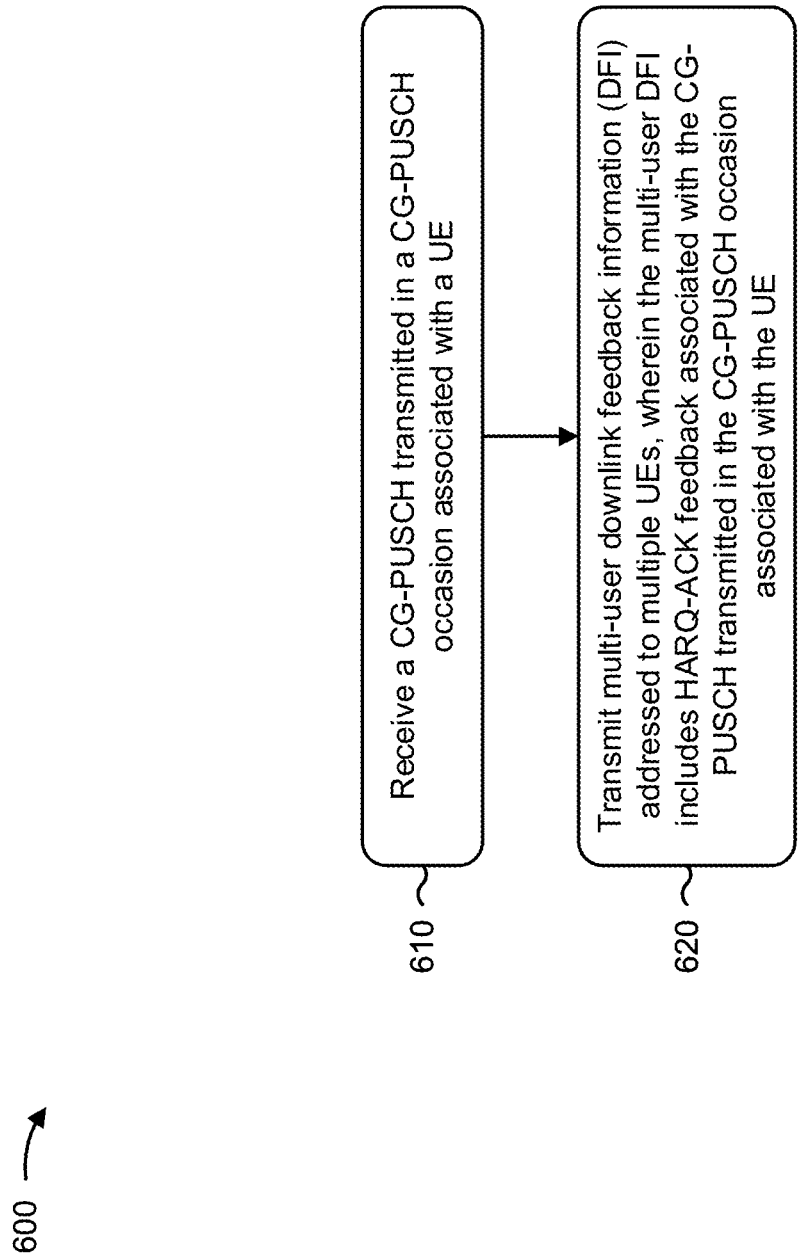

FIG. 6 is a diagram illustrating an example process 600 performed, for example, by a base station, in accordance with the present disclosure. Example process 600 is an example where the base station (e.g., base station 110 and/or the like) performs operations associated with multi-user DFI for configured grant uplink.

As shown in FIG. 6, in some aspects, process 600 may include receiving a CG-PUSCH transmitted in a CG-PUSCH occasion associated with a UE (block 610). For example, the base station may receive (e.g., using antenna 234, DEMOD 232, MIMO detector 236, receive processor 238, controller/processor 240, memory 242, and/or the like) a CG-PUSCH transmitted in a CG-PUSCH occasion associated with a UE, as described above.

As further shown in FIG. 6, in some aspects, process 600 may include transmitting multi-user DFI addressed to multiple UEs, wherein the multi-user DFI includes HARQ-ACK feedback associated with the CG-PUSCH transmitted in the CG-PUSCH occasion associated with the UE (block 620). For example, the base station may transmit (e.g., using controller/processor 240, transmit processor 220, TX MIMO processor 230, MOD 232, antenna 234, memory 242, and/or the like) multi-user DFI addressed to multiple UEs, as described above. In some aspects, the multi-user DFI includes HARQ-ACK feedback associated with the CG-PUSCH transmitted in the CG-PUSCH occasion associated with the UE.

Process 600 may include additional aspects, such as any single aspect or any combination of aspects described below and/or in connection with one or more other processes described elsewhere herein.

In a first aspect, process 600 includes transmitting, to the UE, information configuring one or more parameters associated with the multi-user DFI to enable the UE to decode the multi-user DFI.

In a second aspect, alone or in combination with the first aspect, the one or more parameters include at least one of a DFI-RNTI or a length associated with a DCI message carrying the multi-user DFI.

In a third aspect, alone or in combination with one or more of the first and second aspects, the multi-user DFI has a lower priority than UE-specific DFI scrambled with a CS-RNTI.

In a fourth aspect, alone or in combination with one or more of the first through third aspects, process 600 includes transmitting RRC signaling mapping the CG-PUSCH occasion associated with the UE to one or more bits in the multi-user DFI.

In a fifth aspect, alone or in combination with one or more of the first through fourth aspects, a number of the one or more bits in the multi-user DFI that are mapped to the CG-PUSCH occasion associated with the UE corresponds to a number of CG-PUSCH occasions that occur within a window.

In a sixth aspect, alone or in combination with one or more of the first through fifth aspects, the one or more bits in the multi-user DFI that are mapped to the CG-PUSCH occasion associated with the UE include a NACK for one or more of the CG-PUSCH occasions within the window in which the UE did not transmit a CG-PUSCH.

In a seventh aspect, alone or in combination with one or more of the first through sixth aspects, the multi-user DFI includes the HARQ-ACK feedback associated with the at least one CG-PUSCH based at least in part on the UE transmitting the at least one CG-PUSCH within the window.

In an eighth aspect, alone or in combination with one or more of the first through seventh aspects, the window is configured to end a threshold time prior to a transmission time associated with the multi-user DFI.

In a ninth aspect, alone or in combination with one or more of the first through eighth aspects, the window is configured to cover a maximum time range or a maximum number of slots.

In a tenth aspect, alone or in combination with one or more of the first through ninth aspects, an entry in the multi-user DFI has a state to indicate a collision between the HARQ-ACK feedback associated with the at least one CG-PUSCH transmitted by the UE and HARQ-ACK feedback associated with at least one CG-PUSCH transmitted by another UE.

In an eleventh aspect, alone or in combination with one or more of the first through tenth aspects, the entry in the multi-user DFI is mapped to multiple CG-PUSCH occasions and includes a two-bit field to indicate the collision.

In a twelfth aspect, alone or in combination with one or more of the first through eleventh aspects, the entry indicating the collision is a one-bit flag shared among a set of bits in the multi-user DFI, and the set of bits sharing the one-bit flag include one or more bits that indicate the HARQ-ACK feedback associated with the at least one CG-PUSCH transmitted by the UE.

In a thirteenth aspect, alone or in combination with one or more of the first through twelfth aspects, the multi-user DFI includes a seed to identify one or more bits in the multi-user DFI that are mapped to the CG-PUSCH occasion in which the at least one CG-PUSCH is transmitted.

In a fourteenth aspect, alone or in combination with one or more of the first through thirteenth aspects, the seed has a value to resolve a collision between the HARQ-ACK feedback associated with the at least one CG-PUSCH transmitted by the UE and HARQ-ACK feedback associated with at least one CG-PUSCH transmitted by another UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a UE, comprising: transmitting at least one CG-PUSCH in a CG-PUSCH occasion associated with the UE; and receiving multi-user DFI addressed to multiple UEs, wherein the multi-user DFI includes HARQ-ACK feedback associated with the at least one CG-PUSCH.

Aspect 2: The method of Aspect 1, further comprising: decoding the multi-user DFI based at least in part on one or more parameters associated with the multi-user DFI.

Aspect 3: The method of Aspect 2, wherein the one or more parameters include at least one of a DFI-RNTI or a length associated with a DCI message carrying the multi-user DFI.

Aspect 4: The method of any of Aspects 1-3, wherein the multi-user DFI has a lower priority than UE-specific DFI scrambled with a CS-RNTI.

Aspect 5: The method of any of Aspects 1-4, further comprising: receiving RRC signaling mapping the CG-PUSCH occasion associated with the UE to one or more bits in the multi-user DFI; and identifying the HARQ-ACK feedback associated with the at least one CG-PUSCH based at least in part on the one or more bits in the multi-user DFI that are mapped to the CG-PUSCH occasion associated with the UE.

Aspect 6: The method of Aspect 5, wherein a number of the one or more bits in the multi-user DFI that are mapped to the CG-PUSCH occasion associated with the UE corresponds to a number of CG-PUSCH occasions that occur within a window.

Aspect 7: The method of Aspect 6, wherein the one or more bits in the multi-user DFI that are mapped to the CG-PUSCH occasion associated with the UE include a NACK for one or more of the CG-PUSCH occasions within the window in which the UE did not transmit a CG-PUSCH.

Aspect 8: The method of any of Aspects 6-7, wherein the multi-user DFI includes the HARQ-ACK feedback associated with the at least one CG-PUSCH based at least in part on the UE transmitting the at least one CG-PUSCH within the window.

Aspect 9: The method of any of Aspects 6-8, wherein the window is configured to end a threshold time prior to a transmission time associated with the multi-user DFI.

Aspect 10: The method of any of Aspects 6-9, wherein the window is configured to cover a maximum time range or a maximum number of slots.

Aspect 11: The method of any of Aspects 1-10, wherein an entry in the multi-user DFI has a state to indicate a collision between the HARQ-ACK feedback associated with the at least one CG-PUSCH transmitted by the UE and HARQ-ACK feedback associated with at least one CG-PUSCH transmitted by another UE.

Aspect 12: The method of Aspect 11, wherein the entry in the multi-user DFI is mapped to multiple CG-PUSCH occasions and includes a two-bit field to indicate the collision.

Aspect 13: The method of Aspect 11, wherein the entry indicating the collision is a one-bit flag shared among a set of bits in the multi-user DFI, and wherein the set of bits sharing the one-bit flag include one or more bits that indicate the HARQ-ACK feedback associated with the at least one CG-PUSCH transmitted by the UE.

Aspect 14: The method of any of Aspects 12-13, further comprising: hashing a seed included in the multi-user DFI to identify one or more bits in the multi-user DFI that are mapped to the CG-PUSCH occasion in which the at least one CG-PUSCH is transmitted; and identifying the HARQ-ACK feedback associated with the at least one CG-PUSCH based at least in part on a state of the one or more bits mapped to the CG-PUSCH occasion in which the at least one CG-PUSCH is transmitted.

Aspect 15: The method of Aspect 14, wherein the seed has a value to resolve a collision between the HARQ-ACK feedback associated with the at least one CG-PUSCH transmitted by the UE and HARQ-ACK feedback associated with at least one CG-PUSCH transmitted by another UE.

Aspect 16: A method of wireless communication performed by a base station, comprising: receiving a CG-PUSCH transmitted in a CG-PUSCH occasion associated with a UE; and transmitting multi-user DFI addressed to multiple UEs, wherein the multi-user DFI includes HARQ-ACK feedback associated with the CG-PUSCH transmitted in the CG-PUSCH occasion associated with the UE.

Aspect 17: The method of Aspect 16, further comprising: transmitting, to the UE, information configuring one or more parameters associated with the multi-user DFI, wherein the one or more parameters are transmitted to enable the UE to decode the multi-user DFI.

Aspect 18: The method of Aspect 17, wherein the one or more parameters include at least one of a DFI-RNTI or a length associated with a DCI message carrying the multi-user DFI.

Aspect 19: The method of any of Aspects 16-18, wherein the multi-user DFI has a lower priority than UE-specific DFI scrambled with a CS-RNTI.

Aspect 20: The method of any of Aspects 16-19, further comprising: transmitting RRC signaling mapping the CG-PUSCH occasion associated with the UE to one or more bits in the multi-user DFI.

Aspect 21: The method of Aspect 20, wherein a number of the one or more bits in the multi-user DFI that are mapped to the CG-PUSCH occasion associated with the UE corresponds to a number of CG-PUSCH occasions that occur within a window.

Aspect 22: The method of Aspect 21, wherein the one or more bits in the multi-user DFI that are mapped to the CG-PUSCH occasion associated with the UE include a NACK for one or more of the CG-PUSCH occasions within the window in which the UE did not transmit a CG-PUSCH.

Aspect 23: The method of any of Aspects 21-22, wherein the multi-user DFI includes the HARQ-ACK feedback associated with the at least one CG-PUSCH based at least in part on the UE transmitting the at least one CG-PUSCH within the window.

Aspect 24: The method of any of Aspects 21-23, wherein the window is configured to end a threshold time prior to a transmission time associated with the multi-user DFI.

Aspect 25: The method of any of Aspects 21-24, wherein the window is configured to cover a maximum time range or a maximum number of slots.

Aspect 26: The method of any of Aspects 16-25, wherein an entry in the multi-user DFI has a state to indicate a collision between the HARQ-ACK feedback associated with the at least one CG-PUSCH transmitted by the UE and HARQ-ACK feedback associated with at least one CG-PUSCH transmitted by another UE.

Aspect 27: The method of Aspect 26, wherein the entry in the multi-user DFI is mapped to multiple CG-PUSCH occasions and includes a two-bit field to indicate the collision.

Aspect 28: The method of Aspect 26, wherein the entry indicating the collision is a one-bit flag shared among a set of bits in the multi-user DFI, and wherein the set of bits sharing the one-bit flag include one or more bits that indicate the HARQ-ACK feedback associated with the at least one CG-PUSCH transmitted by the UE.

Aspect 29: The method of any of Aspects 16-28, wherein the multi-user DFI includes a seed to identify one or more bits in the multi-user DFI that are mapped to the CG-PUSCH occasion in which the at least one CG-PUSCH is transmitted.

Aspect 30: The method of Aspect 29, wherein the seed has a value to resolve a collision between the HARQ-ACK feedback associated with the at least one CG-PUSCH transmitted by the UE and HARQ-ACK feedback associated with at least one CG-PUSCH transmitted by another UE.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving radio resource control signaling that configures a mapping between a configured grant physical uplink shared channel (CG-PUSCH) occasion associated with the UE and one or more bits in multi-user downlink feedback information (DFI);
   transmitting at least one CG-PUSCH in the CG-PUSCH occasion associated with the UE; and
   receiving the multi-user DFI addressed to multiple UEs, wherein the multi-user DFI includes hybrid automatic repeat request acknowledgement (HARQ-ACK) feedback associated with the at least one CG-PUSCH.

2. The method of claim 1, further comprising:
   decoding the multi-user DFI based at least in part on one or more parameters associated with the multi-user DFI, wherein the one or more parameters include at least one of a DFI radio network temporary identifier or a length associated with a downlink control information message carrying the multi-user DFI.

3. The method of claim 1, further comprising:
   identifying the HARQ-ACK feedback associated with the at least one CG-PUSCH based at least in part on the one or more bits in the multi-user DFI that are mapped to the CG-PUSCH occasion associated with the UE.

4. The method of claim 1, wherein a number of the one or more bits in the multi-user DFI that are mapped to the CG-PUSCH occasion associated with the UE corresponds to a number of CG-PUSCH occasions that occur within a window.

5. The method of claim 4, wherein the one or more bits in the multi-user DFI that are mapped to the CG-PUSCH occasion associated with the UE include a negative acknowledgement for one or more of the CG-PUSCH occasions within the window in which the UE did not transmit a CG-PUSCH.

6. The method of claim 4, wherein the multi-user DFI includes the HARQ-ACK feedback associated with the at least one CG-PUSCH based at least in part on the UE transmitting the at least one CG-PUSCH within the window.

7. The method of claim 4, wherein the window is configured to end a threshold time prior to a transmission time associated with the multi-user DFI, and wherein the window is configured to cover a maximum time range or a maximum number of slots.

8. The method of claim 1, wherein an entry in the multi-user DFI has a state to indicate a collision between the HARQ-ACK feedback associated with the at least one CG-PUSCH transmitted by the UE and HARQ-ACK feedback associated with at least one CG-PUSCH transmitted by another UE.

9. The method of claim 8, wherein the entry in the multi-user DFI is mapped to multiple CG-PUSCH occasions and includes a two-bit field to indicate the collision.

10. The method of claim 8, wherein the entry indicating the collision is a one-bit flag shared among a set of bits in the multi-user DFI, and wherein the set of bits sharing the one-bit flag include one or more bits that indicate the HARQ-ACK feedback associated with the at least one CG-PUSCH transmitted by the UE.

11. The method of claim 1, further comprising:
   hashing a seed included in the multi-user DFI to identify one or more bits in the multi-user DFI that are mapped to the CG-PUSCH occasion in which the at least one CG-PUSCH is transmitted, wherein the seed has a value to resolve a collision between the HARQ-ACK feedback associated with the at least one CG-PUSCH transmitted by the UE and HARQ-ACK feedback associated with at least one CG-PUSCH transmitted by another UE; and
   identifying the HARQ-ACK feedback associated with the at least one CG-PUSCH based at least in part on a state of the one or more bits mapped to the CG-PUSCH occasion in which the at least one CG-PUSCH is transmitted.

12. A method of wireless communication performed by a network entity, comprising:
   transmitting radio resource control signaling mapping a configured grant physical uplink shared channel (CG-PUSCH) occasion associated with a user equipment (UE) to one or more bits in multi-user downlink feedback information (DFI);
   receiving a CG-PUSCH transmitted in the CG-PUSCH occasion associated with the UE; and
   transmitting the multi-user DFI addressed to multiple UEs, wherein the multi-user DFI includes hybrid automatic repeat request acknowledgement (HARQ-ACK) feedback associated with the CG-PUSCH transmitted in the CG-PUSCH occasion associated with the UE.

13. The method of claim 12, further comprising:
   transmitting, to the UE, information configuring one or more parameters associated with the multi-user DFI, wherein the one or more parameters include at least one of a DFI radio network temporary identifier or a length associated with a downlink control information message carrying the multi-user DFI.

14. The method of claim 12, wherein a number of the one or more bits in the multi-user DFI that are mapped to the CG-PUSCH occasion associated with the UE corresponds to a number of CG-PUSCH occasions that occur within a window.

15. The method of claim 14, wherein the one or more bits in the multi-user DFI that are mapped to the CG-PUSCH occasion associated with the UE include a negative acknowledgement for one or more of the CG-PUSCH occasions within the window in which the UE did not transmit a CG-PUSCH.

16. The method of claim 14, wherein the multi-user DFI includes the HARQ-ACK feedback associated with the CG-PUSCH based at least in part on the UE transmitting the CG-PUSCH within the window.

17. The method of claim 14, wherein the window is configured to end a threshold time prior to a transmission time associated with the multi-user DFI, and wherein the window is configured to cover a maximum time range or a maximum number of slots.

18. The method of claim 12, wherein an entry in the multi-user DFI has a state to indicate a collision between the HARQ-ACK feedback associated with the CG-PUSCH transmitted by the UE and HARQ-ACK feedback associated with at least one CG-PUSCH transmitted by another UE.

19. The method of claim 18, wherein the entry in the multi-user DFI is mapped to multiple CG-PUSCH occasions and includes a two-bit field to indicate the collision.

20. The method of claim 18, wherein the entry indicating the collision is a one-bit flag shared among a set of bits in the multi-user DFI, and wherein the set of bits sharing the one-bit flag include one or more bits that indicate the HARQ-ACK feedback associated with the CG-PUSCH transmitted by the UE.

21. The method of claim 12, wherein the multi-user DFI includes a seed to identify one or more bits in the multi-user DFI that are mapped to the CG-PUSCH occasion in which the CG-PUSCH is transmitted, and wherein the seed has a value to resolve a collision between the HARQ-ACK feedback associated with the CG-PUSCH transmitted by the UE and HARQ-ACK feedback associated with at least one CG-PUSCH transmitted by another UE.

22. A user equipment (UE) for wireless communication, comprising:
   a memory; and
   one or more processors, coupled to the memory, configured to:
      receive radio resource control signaling that configures a mapping between a configured grant physical uplink shared channel (CG-PUSCH) occasion associated with the UE and one or more bits in multi-user downlink feedback information (DFI);
      transmit at least one CG-PUSCH in the CG-PUSCH occasion associated with the UE; and
      receive the multi-user DFI addressed to multiple UEs, wherein the multi-user DFI includes hybrid automatic repeat request acknowledgement (HARQ-ACK) feedback associated with the at least one CG-PUSCH.

23. The UE of claim 22, wherein the one or more processors are further configured to:
   decode the multi-user DFI based at least in part on one or more parameters associated with the multi-user DFI.

24. The UE of claim 22, wherein the one or more processors are further configured to:
   identify the HARQ-ACK feedback associated with the at least one CG-PUSCH based at least in part on the one or more bits in the multi-user DFI that are mapped to the CG-PUSCH occasion associated with the UE.

25. The UE of claim 22, wherein an entry in the multi-user DFI has a state to indicate a collision between the HARQ-ACK feedback associated with the at least one CG-PUSCH transmitted by the UE and HARQ-ACK feedback associated with at least one CG-PUSCH transmitted by another UE.

26. The UE of claim 22, wherein the one or more processors are further configured to:
   hash a seed included in the multi-user DFI to identify one or more bits in the multi-user DFI that are mapped to the CG-PUSCH occasion in which the at least one CG-PUSCH is transmitted; and
   identify the HARQ-ACK feedback associated with the at least one CG-PUSCH based at least in part on a state of the one or more bits mapped to the CG-PUSCH occasion in which the at least one CG-PUSCH is transmitted.

27. The UE of claim 22, wherein a number of the one or more bits in the multi-user DFI that are mapped to the CG-PUSCH occasion associated with the UE corresponds to a number of CG-PUSCH occasions that occur within a window.

28. A network entity for wireless communication, comprising:
   a memory; and
   one or more processors, coupled to the memory, configured to:
      transmit radio resource control signaling mapping a configured grant physical uplink shared channel (CG-PUSCH) occasion associated with a user equipment (UE) to one or more bits in multi-user downlink feedback information (DFI);
      receive a CG-PUSCH transmitted in the CG-PUSCH occasion associated with the UE; and
      transmit the multi-user DFI addressed to multiple UEs, wherein the multi-user DFI includes hybrid automatic repeat request acknowledgement (HARQ-ACK) feedback associated with the CG-PUSCH transmitted in the CG-PUSCH occasion associated with the UE.

29. The network entity of claim 28, wherein the one or more processors are further configured to:
   transmit, to the UE, information configuring one or more parameters associated with the multi-user DFI.

30. The network entity of claim 28, wherein an entry in the multi-user DFI has a state to indicate a collision between the HARQ-ACK feedback associated with the CG-PUSCH transmitted by the UE and HARQ-ACK feedback associated with at least one CG-PUSCH transmitted by another UE.

* * * * *